United States Patent [19]

Schulz

[11] Patent Number: 4,667,516
[45] Date of Patent: May 26, 1987

[54] CIRCUIT ARRANGEMENT FOR COMPENSATING FOR THE TEMPERATURE DEPENDENCE OF THE SENSITIVITY AND THE NULL POINT OF A PIEZORESISTIVE PRESSURE SENSOR

[75] Inventor: Winfried Schulz, Berlin, Fed. Rep. of Germany

[73] Assignee: Siemens Aktiengesellschaft, Munich, Fed. Rep. of Germany

[21] Appl. No.: 820,206

[22] Filed: Jan. 17, 1986

[30] Foreign Application Priority Data

Jan. 30, 1985 [DE] Fed. Rep. of Germany ....... 3503489

[51] Int. Cl.$^4$ .......................... G01L 9/06; G01L 19/04
[52] U.S. Cl. ........................................ 73/708; 73/721;
73/727; 73/862.63; 323/367; 323/907;
324/DIG. 1
[58] Field of Search ............ 73/708, 721, 727, 862.63,
73/766; 323/367, 365, 907; 324/62, 65 R, DIG. 1

[56] References Cited

U.S. PATENT DOCUMENTS

| 3,654,545 | 4/1972 | Demark | 323/280 |
|---|---|---|---|
| 4,190,804 | 2/1980 | Pyne et al. | 328/3 |
| 4,233,848 | 11/1980 | Sato et al. | 73/708 |
| 4,463,274 | 7/1984 | Swartz | 307/491 |
| 4,532,468 | 7/1985 | Nishida et al. | 323/367 |
| 4,611,163 | 9/1986 | Madeley | 73/862.63 |

FOREIGN PATENT DOCUMENTS 2414193 8/1979 France.
0122923 7/1984 Japan.
8103094 10/1981 PCT Int'l Appl..

OTHER PUBLICATIONS

"Elektronik", 13/Jun. 29, 1984, pp. 95–98.

Primary Examiner—Donald O. Woodiel
Attorney, Agent, or Firm—Kenyon & Kenyon

[57] ABSTRACT

A circuit arrangement for compensating for the temperature dependence of the sensitivity and of the null point of a piezoresistive pressure sensor having a temperature sensor thermally coupled thereto. The temperature sensor is coupled to an auxiliary amplifier, in the output circuit of which the feed diagonal of the pressure sensor is connected. The output diagonal of the pressure sensor is connected to an output amplifier, to which a temperature-dependent correction voltage can be applied on the input side via a resistor arrangement. To perform the compensation of the temperature dependence of the sensitivity independently of the temperature dependence of the null point, the resistor arrangement is connected directly to the output of the temperature sensor, preferably via jumpers.

8 Claims, 1 Drawing Figure

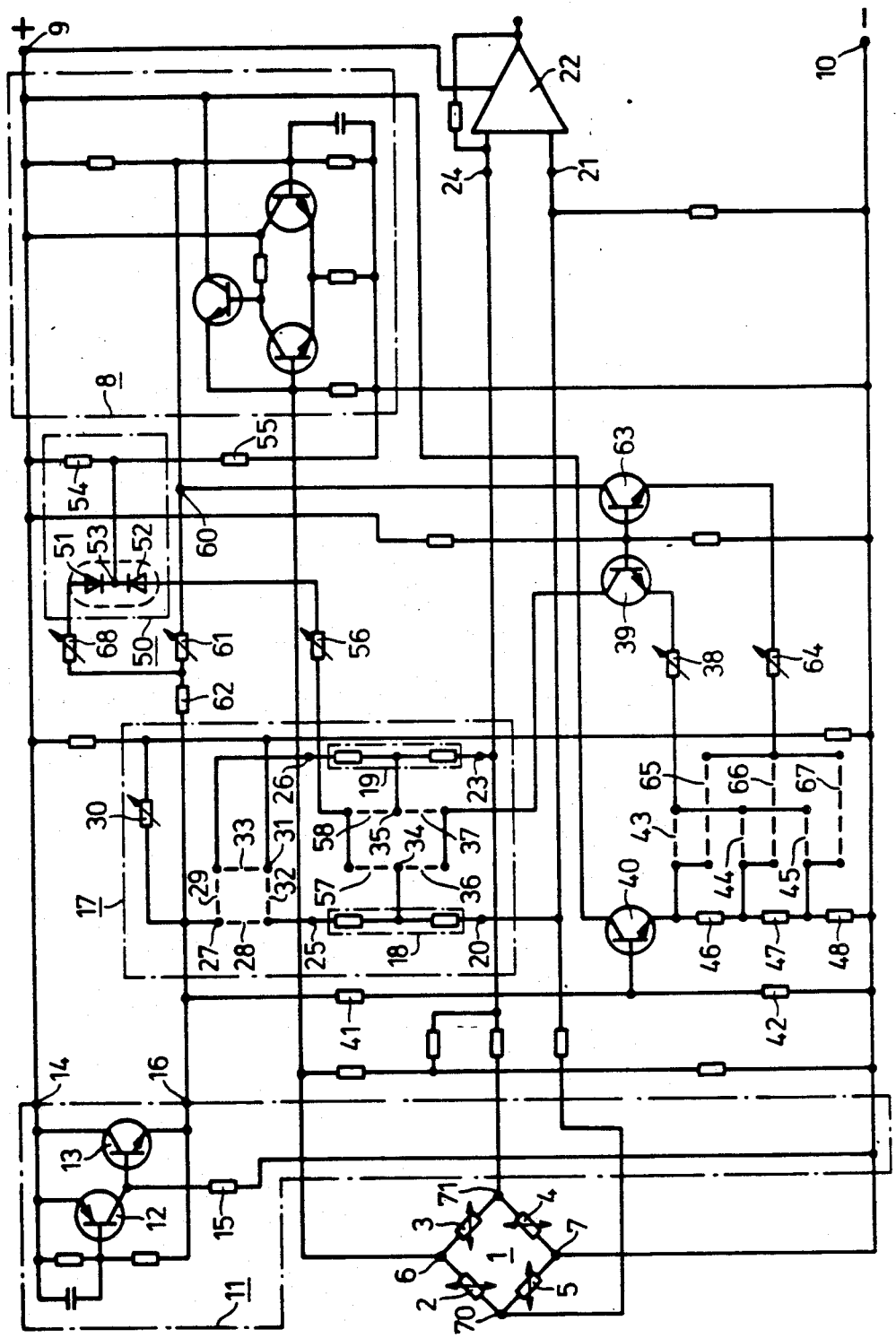

CIRCUIT ARRANGEMENT FOR COMPENSATING FOR THE TEMPERATURE DEPENDENCE OF THE SENSITIVITY AND THE NULL POINT OF A PIEZORESISTIVE PRESSURE SENSOR

BACKGROUND OF THE INVENTION

The present invention relates to a circuit arrangement for compensating for the temperature dependence of the sensitivity and the null point of a piezoresistive pressure sensor in a bridge circuit having an auxiliary amplifier which is arranged thermally coupled to the pressure sensor and is connected to the latter, and in the output circuit of which the feed diagonal of the pressure sensor is connected, as well as having an output amplifier which is connected to the output diagonal of the pressure sensor, and to the input of which a temperature dependent correction voltage can be applied via a resistor arrangement.

In a known circuit arrangement of this type ("Elektronik" 13/June 29, 1984, pages 95-98), a temperature sensor connected in series with a resistor forms a temperature feeler, to the output of which the input of an operational amplifier is connected. On the output side, the operational amplifier acts on a transistor which serves as a control element (chopper) and into the emitter-collector circuit of which the feed diagonal of the pressure sensor is connected in a bridge circuit; in this manner, a temperature-controlled voltage supply for the pressure sensor is made available, by which the temperature dependence of the sensitivity of the pressure sensor is compensated. For compensating for the temperature dependence of the null point of the pressure sensor in the known circuit arrangement, a resistor arrangement is provided which is connected on the one hand via resistors to one input of an output amplifier connected to the output diagonal of the pressure sensor and, on the other hand, to a fixed reference voltage; the reference potential of the output amplifier is made available by means of a further operational amplifier which is connected on the input side parallel to the feed diagonal of the pressure sensor, so that the compensation of the temperature behavior of the null point of the pressure sensor depends, in the known circuit arrangement, on the magnitude of the voltage at the feed diagonal of the pressure sensor.

SUMMARY OF THE INVENTION

It is, therefore, an object of the present invention to provide a circuit arrangement for compensating for the temperature dependence on the sensitivity and the null point of a piezoresistive pressure sensor in a bridge circuit, wherein the compensation of the temperature dependence of the sensitivity can be performed independently of the compensation of the temperature dependence of the null point by decoupling the circuit parts required therefor from each other without reaction.

According to the invention, the resistor arrangement, in a circuit arrangement of the type mentioned above, is coupled directly to the output of the temperature feeler.

It is a substantial advantage of a circuit arrangement according to the invention that in it, due to the resistor arrangement being directly connected to the output of the temperature feeler, the compensation of the temperature dependence of the sensitivity of the piezoresistive pressure sensor can be performed independently of the compensation of the temperature dependence of the null point of the pressure sensor because both compensations take place without mutual influence due to the decoupling without reaction. Thereby, the time required for adjusting the circuit arrangement with respect to the desired overall compensation can be kept small, whereby the number of heating ovens required for the compensation can likewise be kept small, which in turn facilitates the mass production of pressure measuring transducers considerably.

In the circuit arrangement according to the invention, it has been found to be advantageous if the resistor arrangement contains two voltage dividers of which one voltage divider is connected with its terminal end to an input of the output amplifier, and the other voltage divider is connected with its one terminal end to the other input of the output amplifier, and if, in dependence on the temperature behavior of the null point of the pressure sensor, either the first or the second voltage divider is connected via contacts, e.g., jumpers, directly with its other terminal end, to the output of the temperature feeler while the remaining voltage divider is connected with its other terminal end to the output of the temperature feeler via a balancing resistor. The jumpers allow taking into consideration from the start the temperature-dependent behavior of the null point of the respective pressure sensor, the trend of which is known, so that the compensation of the temperature dependence of the null point can be performed in a simple manner by changing the balancing resistor in a predetermined output temperature range of, for instance, 35° C. to 45° C.

Piezoresistive pressure sensors usually have a heavily curved temperature dependence of the sensitivity as well as of the null point over the temperature range of interest. Therefore, it is, as a rule, necessary for compensation to subdivide the entire temperature range into several sections. A lower section of the entire temperature range can be compensated with respect to the temperature dependence of the null point in the circuit according to the invention, advantageously by the provision that, via further contacts at the taps of the voltage dividers, a further balancing resistor can be connected which is arranged in the collector-emitter circuit of a transistor to the reference potential of the output amplifier, and that the transistor can be switched by a control resistor connected to the output of the temperature sensor. The control resistor is connected so that it switches, upon reaching a predetermined temperature of, for instance, +10° C., the resistor connected thereto, whereby then the further balancing resistor becomes effective and decreases after adjustment, the correction voltage present at the inputs of the output amplifier in the required manner.

To compensate the pressure sensor as to the temperature dependence of its null point in a range of relatively high temperature, it is advantageous in the circuit arrangement according to the invention if, via additional contacts at the taps of the voltage dividers, an additional balancing resistor can be connected which can be activated by a threshold circuit connected to the output of the temperature sensor. If the temperature to which the pressure sensor is subjected reaches a relatively high value of, for instance, 45° C., the threshold circuit responds due to the relatively high output voltage of the temperature feeler, whereby, after the additional balancing resistor is adjusted via this resistor, the temperature-dependent correction voltage at the inputs of the output amplifier is changed to the extent required.

Due to the appropriate balancing of all balancing resistors in the temperature ranges mentioned, the temperature behavior of the null point of the pressure sensor can thus be compensated by means of the resistor arrangement described over a relatively large temperature range in sections.

In the circuit arrangement according to the invention, the temperature behavior of the sensitivity of the pressure sensor is first compensated in a manner known per se in a predetermined output temperature range of, for instance 25° C. to 45° by the provision that, via an adjustable resistor between the output of the temperature feeler and the input of the auxiliary amplifier, a voltage occurs by means of an appropriate control of this amplifier at the input diagonal of the pressure sensor such as is required for compensating the sensitivity. This adjustment is made jointly with the compensation of the null point drift of the pressure sensor in this temperature range.

To compensate for the sensitivity also in the range of relatively low temperatures, a correction resistor can be connected, according to the invention, at the input of the auxiliary amplifier which is arranged in the collector-emitter circuit of a further transistor, connected to the reference potential of the output amplifier, and the further transistor can be switched by the control transistor. In this manner, provision is made in an inexpensive manner and without reaction, and decoupled from the compensation of the temperature behavior of the null point, so that the sensitivity of the pressure sensor in the lower temperature range can be compensated, where this compensation takes place logically jointly with the compensation of the null point drift in this temperature range.

To compensate for the temperature behavior of the sensitivity in an upper temperature range, a further correction resistor can advantageously be connected, in the circuit arrangement according to the invention, to the input of the auxiliary amplifier and via the threshold circuit, which correction resistor is in connection with the output of the temperature sensor. This correction resistor is therefore activated in dependence on the magnitude of the output voltage of the temperature sensor at a relatively high temperature and insures, after appropriate adjustment, the changing of the output voltage of the auxiliary amplifier or the voltage at the input diagonal of the pressure sensor in such a manner that the temperature behavior is compensated also in the upper temperature range.

The threshold circuit of the circuit arrangement according to the invention advantageously contains two diodes which are poled in opposite directions and the common circuit point of which is kept at a predetermined potential; to the one diode is connected the additional balancing resistor and to the other diode, the further correction resistor.

The temperature sensor of the circuit arrangement according to the invention advantageously contains at least one transistor as the temperature-measuring element which is followed by an impedance transformer. Such a design of a temperature sensor is characterized by high linearity and very little current drain, which is advantageous particularly in an application with measuring transformers in two-conductor technique.

BRIEF DESCRIPTION OF THE DRAWING

The invention will be explained in greater detail in the following detailed description with reference to the single drawing figure which shows an embodiment of the circuit arrangement according to the invention.

DETAILED DESCRIPTION

With reference to the drawing figure, the circuit arrangement shown serves for compensating for the temperature dependence of the sensitivity and the null point of a piezoresistive pressure sensor 1 which comprises several piezoresistive elements 2, 3, 4 and 5 in a bridge circuit. The pressure sensor 1 is connected with its input diagonal 6, 7 in the output circuit of an auxiliary amplifier 8 which is connected to a positive pole 9 and to a negative pole 10 of a supply voltage source, not shown.

Besides the auxiliary amplifier 8, the circuit arrangement contains, among other things, a temperature feeler 11 which contains two transistors 12 and 13 as the temperature-sensing elements and which at the same time form an amplifier. A temperature feeler is thereby obtained which is distinguished by a very small current drain. Transistor 12 serves as a temperature sensor while transistor 13 serves as an impedance matching device. The temperature feeler 11 is connected with one input 14 to the positive pole 9 and via a reistor 15 to the negative pole of the supply voltage source. A voltage dependent on the temperature of the temperature feeler 11 is present at an output 16 of the temperature feeler 11. This voltage of the temperature feeler 11 is a measure of the temperature to which the pressure sensor 1 is exposed, because the temperature feeler 11 is thermally coupled, i.e., is in physical proximity, with the pressure sensor 1.

A further component of the circuit arrangement shown is a resistor arrangement 17 which contains two voltage dividers 18 and 19. One voltage divider 18 is connected with its one terminal end 20 to one input 21 of an output amplifier 22, while the other voltage divider 19 is connected, with its one terminal end 23, to a further input 24 of the output amplifier 22. The other respective terminal ends 25 and 26 of the two voltage dividers 18 and 19 are connected to a terminal point 27 via switching elements 28 and 29 in dependence on the temperature behavior of the null point of the respective pressure sensor 1, the trend of which is known. The jumper 28 is effective in the case of positive behavior, and the jumper 29 in the case of negative behavior of the null point. The circuit point 27 is connected permanently to the output 16 of the temperature feeler 11. The resistor arrangement 17 further contains a balancing resistor 30 which is connected with its one end permanently to the circuit point 27 or the output 16 of the temperature feeler 11, while its other end is brought to a circuit point 31; via a jumper 32 (in the case of positive temperature behavior) or a jumper 33 (in the case of negative temperature behavior), the balancing resistor 30 can be connected either in series with the one voltage divider 18 or in series with the other voltage divider 19.

Each of the two voltage dividers 18 and 19 is provided with a tap 34 and 35, respectively. To these taps 34 and 35, a further balancing resistor 38 can be connected via further jumpers 36 and 37. This is accomplished by means of a transistor 39 which can be controlled by a preceding control transistor 40. This control transistor 40 is connected to a voltage divider which is formed by the resistors 41 and 42 and to which the voltage at the output 16 of the temperature feeler 11 is applied. The control transistor 40 is accordingly acted upon by a voltage depending on the temperature and switches the transistor 39 at temperatures (for instance, 10° C., 15° C., 20° C.) which can be selected via jumpers 43, 44 and 45 assigned to different temperatures, in cooperation with resistors 46, 47 and 48. With the further balancing resistor 38, a compensation of the temperature behavior of the null point of the pressure sensor 1 is effected in a lower temperature range.

In order to compensate for the temperature behavior of the null point of the pressure sensor 1 in an upper temperature range, a threshold circuit 50 is provided which comprises, among other things, two diodes 51 and 52 which are poled opposing each other. A common circuit point 53 of the two diodes 51 and 52 is maintained by a voltage divider including, among other things, resistors 54 and 55, at a predetermined potential. At the end facing away from the common circuit point 33, the diode 52 is connected to an additional balancing resistor 56 which is effective if the voltage at the output 16 is likewise relatively high due to a relatively high temperature.

The auxiliary amplifier 8 already mentioned above is connected with its input 60 to the output of the temperature feeler 11 via an adjustable resistor 61 and a fixed resistor 62. In addition, there can be connected to the input 60 of the auxiliary amplifier 8 via a further transistor 63, a correction resistor 64 which can be connected via further jumpers 65, 66 and 67 to the resistors 46 to 48. The further transistor 63 is connected, like the transistor 39, by the control transistor 40 at a relatively low temperature so that thereby the voltage at the input of the auxiliary amplifier 8 and thereby also the voltage fed from the output of the auxiliary amplifier 8 of the feed diagonal 6-7 of the pressure sensor 1 is corrected.

A further correction resistor 68 is connected to the anode terminal of the diode 51 of the threshold circuit 50 and via fixed resistor 62, to the output 16 of the temperature feeler 11. In this manner, the temperature behavior of the sensitivity of the pressure sensor 1 in a higher temperature range can be compensated, because, via this further correction resistor 68, the input voltage of the auxiliary amplifier 8 is changed due to the connection via the resistor 55.

In the adjustment of the circuit arrangement shown for compensating for the temperature dependence, the circuit arrangement is designed first in such a manner that it meets the stated requirements at a temperature of, say 25° C. Subsequently, the circuit arrangement with the pressure sensor 1 is subjected to a temperature of 45° C. At this temperature, the balancing resistor 30 is changed on the one hand so that the temperature behavior of the null point remains constant in the temperature range from 25° C. to 45° C. and on the other hand, the adjustable resistor 61 is set so that also the sensitivity in this temperature range is constant.

Above the temperature of 45° C., the threshold circuit 50 responds by making the diodes 51 and 52 conductive. The additional balancing resistor 56 is now trimmed so that the null point remains constant also at this temperature of, for instance, up to 65° C. Likewise, the further correction resistor 68 is trimmed, so that the null point remains constant also at this temperature of, for instance, up to 65° C. Likewise, the further correction resistor 68 is adjusted so that the temperature behavior of the sensitivity remains constant in this temperature range.

Below 25° C., the transistors 39 and 63 are set in operation, where the set-in point can be adjusted by the jumpers 43 to 45 as well as 65 to 67, for instance, to 10° C., 15° C., or 20° C. By adjusting the further balancing resistor 38, the temperature behavior of the null point can be kept constant also in the range below 25° C., while by adjustment of the correction resistor 64, the sensitivity can be maintained constant and independent of the temperature in this temperature range.

The described adjustment work for compensating for the temperature behavior of the sensitivity and the null point of the pressure sensor 1 can be performed independently of each other with respect to the sensitivity of the null point, whereby the adjustment work can be carried out relatively simply and thereby, with little expenditure of time.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A circuit arrangement for compensating for the temperature dependence of the sensitivity and the null point of a piezoresistive pressure sensor in a bridge circuit, said bridge circuit having an input diagonal and an output diagonal, and further comprising a temperature sensor arranged thermally coupled to the pressure sensor and an auxiliary amplifier coupled to the temperature sensor, the feed diagonal of the pressure sensor being coupled to an output of the auxiliary amplifier, an output amplifier being coupled to the output diagonal of the pressure sensor, a temperature-dependent correction voltage being applied to an input of the output amplfiier via a resistor arrangement, the resistor arrangement being directly coupled to the output of the temperature sensor.

2. The circuit arrangment recited in claim 1, wherein the resistor arrangement contains two voltage dividers, one of the voltage dividers being connected at a first terminal end to one input of the output amplifier and the other voltage divider being connected at a first terminal end to the other input of the output amplifier, one of the other terminal ends of one of the voltage dividers, in dependence on the temperature behavior of the null point of the pressure sensor, being coupled by a jumper means directly to the output of the temperature sensor and the other terminal end of the other voltage divider being coupled to the output of the temperature sensor via a balancing resistor.

3. The circuit arrangement recited in claim 2, further comprising a further balancing resistor coupled to taps of the voltage dividers by further jumper means, said further balancing resistor being arranged in the collector-emitter circuit of a transistor coupled to a reference potential of the output amplifier, the transistor being switched by a control transistor coupled to the output of the temperature sensor.

4. The circuit arrangement recited in claim 2, further comprising an additional balancing resistor coupled to taps of the voltage dividers by additional jumper means, and further comprising a threshold circuit coupled to the output of the temperature sensor, said threshold circuit coupled to said additional balancing resistor.

5. The circuit arrangement recited in claim 3, further comprising a correction resistor arranged in the collector-emitter circuit of a further transistor connected to the reference potential of the output amplifier, said correction resistor being connected to an input of the auxiliary amplifier, said further transistor being responsive to said control transistor.

6. The circuit arrangement recited in claim 4, further comprising a further correction resistor coupled to the output of the temperature sensor and being coupled to the input of the auxiliary amplifier via the threshold circuit.

7. The circuit arrangement recited in claim 6, wherein the threshold circuit contains two diodes which are poled in opposite directions, said diodes having a common circuit point which is maintained at a predetermined potential, said additional balancing resistor being connected to one of said diodes and the further correction resistor being connected to the other diode.

8. The circuit arrangement recited in claim 1 wherein the temperature sensor comprises at least one transistor as the temperature-measuring element coupled to an impedance transformer.

* * * * *